United States Patent [19]

Miyamoto et al.

[11] Patent Number: 6,029,012
[45] Date of Patent: Feb. 22, 2000

[54] SELF-TIMER CAMERA EQUIPPED WITH A RED-EYE REDUCING FUNCTION

[75] Inventors: Hidenori Miyamoto, Urayasu; Kiyosada Machida, Urawa, both of Japan

[73] Assignee: Nikon Corporation, Tokyo, Japan

[21] Appl. No.: 08/946,662

[22] Filed: Oct. 7, 1997

Related U.S. Application Data

[63] Continuation of application No. 08/769,274, Dec. 18, 1996, abandoned, which is a continuation of application No. 08/378,441, Jan. 25, 1995, abandoned.

[30] Foreign Application Priority Data

Feb. 4, 1994 [JP] Japan ................................ 6-012756

[51] Int. Cl.⁷ ............................ G03B 15/05; G03B 15/03
[52] U.S. Cl. ......................................... 396/158; 396/264
[58] Field of Search .................................. 396/263–264, 396/157–158

[56] References Cited

U.S. PATENT DOCUMENTS

| | | | |
|---|---|---|---|
| 5,132,718 | 7/1992 | Fujino et al. | 354/149.1 |
| 5,202,720 | 4/1993 | Fujino et al. | 354/149.11 |
| 5,227,831 | 7/1993 | Miyazaki et al. | 354/402 |
| 5,231,446 | 7/1993 | Ohtsuka | 354/267.1 |
| 5,264,894 | 11/1993 | Kobayashi et al. | 354/129 |
| 5,289,219 | 2/1994 | Masuda et al. | 354/267.1 |
| 5,300,970 | 4/1994 | Fukuhara et al. | 354/415 |
| 5,317,361 | 5/1994 | Fukuhara et al. | 354/415 |
| 5,355,189 | 10/1994 | Kobayashi et al. | 354/149.11 |
| 5,400,113 | 3/1995 | Sosa et al. | 354/415 |
| 5,521,671 | 5/1996 | Aoki et al. | 354/289.1 |
| 5,664,241 | 9/1997 | Kanai et al. | 396/158 |

OTHER PUBLICATIONS

Abstract of Japanese patent 6–130447, May 1994.
Abstract of Japanese patent 6–51379, Feb. 1994.
Abstract of Japanese patent 4–289831, Oct. 1992.
Abstract of Japanese patent 3–284739, Dec. 1991.

*Primary Examiner*—Russell Adams
*Assistant Examiner*—Michael Dalakis
*Attorney, Agent, or Firm*—Oliff & Berridge, PLC

[57] ABSTRACT

A self-timer camera equipped with a red-eye reducing function is provided with a photographing device that performs photographing, a light emitting device that performs light emission to illuminate the photographic subject in synchronization with the operation of the photographing device when the condition for flash photographing is present and which also performs pre-light emission for red-eye reduction prior to the light emission for illuminating the photographic subject if a red-eye reducing mode is being set when the condition for flash photographing is present, a photographing control device, which causes the photographing device to operate after a specific length of self-timer time has elapsed from the time point at which a photographing start instruction was output when a self-timer mode is set, and a mode setting device, which sets the self-timer mode in response to a specific operation and which also sets the red-eye reducing mode as the self-timer mode is set.

4 Claims, 9 Drawing Sheets

FIG. 6A

| FLASH MODE | DISPLAY | |
| --- | --- | --- |
| | RED-EYE REDUCING MODE SET | RED-EYE REDUCING MODE NOT SET |
| AUTOMATIC LIGHT EMISSION MODE | AUTO 👁/⚡ [1] | AUTO ⚡ [1] |
| FORCED INFINITY MODE | 👁 ⊘⚡ ▲▲ [1] | ⊘⚡ ▲▲ [1] |
| LIGHT EMISSION PROHIBIT MODE | 👁 ⊘⚡ [1] | ⊘⚡ [1] |
| FORCED LIGHT EMISSION MODE | 👁 ⚡ [1] | ⚡ [1] |

FIG. 6B

| PHOTOGRAPHING MODE | DISPLAY |
| --- | --- |
| RED-EYE REDUCING MODE | AUTO 👁 ⚡ [1] |
| SELF-TIMER MODE RED-EYE REDUCING MODE | AUTO 👁 ⚡ ⏲ [1] |
| NORMAL PHOTOGRAPHING MODE | AUTO ⚡ [1] |

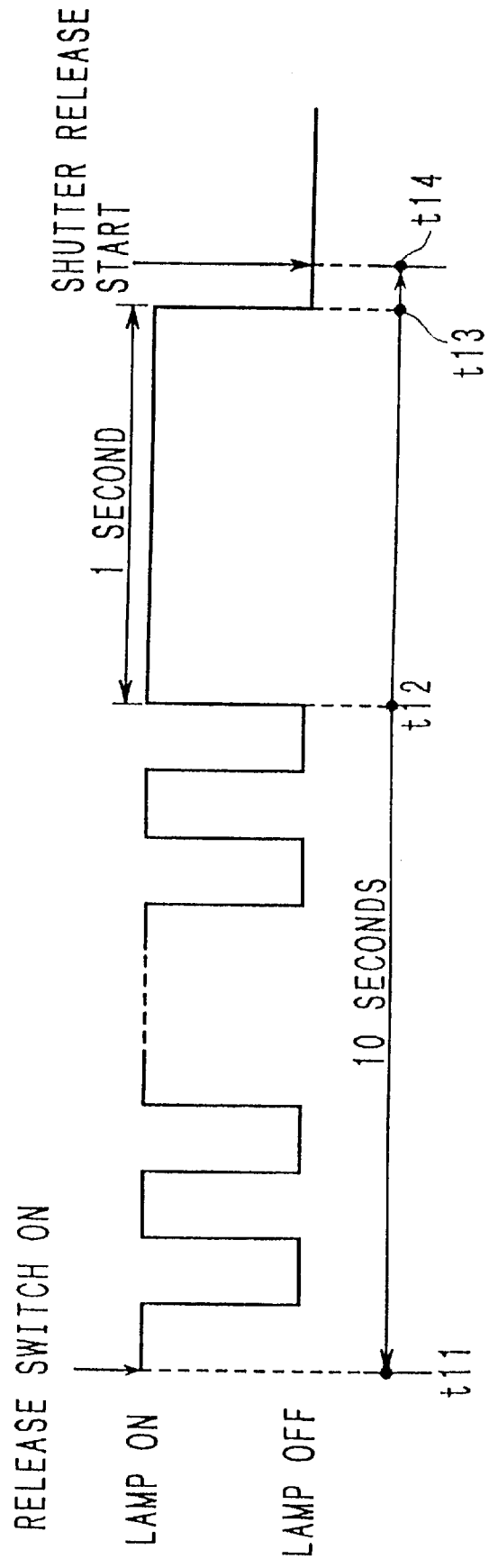

SELF-TIMER CAMERA EQUIPPED WITH A RED-EYE REDUCING FUNCTION

This is a Continuation of application Ser. No. 08/769,274 filed Dec. 18, 1996, now abandoned, which in turn is a continuation of application Ser. No. 08/378,441, filed Jan. 25, 1995 now abandoned.

BACKGROUND OF THE INVENTION

1. Field of the Invention

The present invention relates to a camera capable of pre-light emission for red-eye reduction and also self-timer photographing.

2. Description of the Related Art

Cameras which perform pre-light emission for red-eye reduction prior to photographing, in order to prevent the so-called red-eye phenomenon, in which the eyes of the photographic subject are rendered red on the print by flash photographing, are known in the prior art. With this type of camera, when the release button is operated while the red-eye reducing mode is set, a pre-light emission is performed by an electronic flash device or a special pre-light emission device. After that, the main light emission of the electronic flash device is performed as the shutter is released. The pre-light emission thus causes the pupils of the person, i. e., the photographic subject, to contract, and flash photographing is performed in this state. Therefore, in the finished photograph, the red-eye phenomenon will be less conspicuous.

In a camera capable of self-timer photographing, when the self-timer mode is set, the shutter is released after a specific length of counter time has elapsed from the time point at which the release button was operated.

Since we can assume that the photographic subject during self-timer photographing is usually a person, it follows that when flash photographing is performed using the self-timer, a pre-light emission for red-eye reduction is required as well. However, the structure of self-timer cameras equipped with a red-eye reducing function in the prior art is such that the self-timer mode and the red-eye reducing mode are set independently of each other. Therefore, when performing flash photographing using the self-timer, the setting operations for the two modes described above must be performed separately. This presents a problem of low operability. In addition, there is a likelihood that the photographer will set the self-timer mode and forget to set the red-eye reducing mode. In that case, the photograph will exhibit the red-eye phenomenon.

SUMMARY OF THE INVENTION

The object of the present invention is to provide a self-timer camera with improved operability when flash photographing is performed using a self-timer and which can prevent the occurrence of the red-eye phenomenon caused by the photographer forgetting to set the red-eye reducing mode.

In order to achieve the object described above, the self-timer camera equipped with a red-eye reducing function according to the present invention is provided with a photographing device that performs photographing, a light emitting device that, when the condition for flash photographing is present, performs light emission to illuminate the photographic subject in synchronization with the operation of the photographing device and which also performs pre-light emission for red-eye reduction prior to the light emission for illuminating the photographic subject if the red-eye reducing mode is being set when the condition for flash photographing is present, a photographing control device, which actuates the photographing device after a specific length of self-timer time has elapsed from the time point at which the output of a photographing start instruction was output when the self-timer mode is set, and a mode setting device, which sets the self-timer mode in response to a specific operation and which also sets the red-eye reducing mode when the self-timer mode is set.

According to the present invention, when the self-timer mode is set, the red-eye reducing mode is also automatically set. This means that it is not necessary to perform separate setting operations for the self-timer mode and the red-eye reducing mode, and therefore, an improvement in operability is achieved. At the same time, the occurrence of the red-eye phenomenon due to the photographer forgetting to set the red-eye reducing mode in the self-timer mode, can be reliably prevented.

BRIEF DESCRIPTION OF THE DRAWINGS

FIG. 6A shows examples of display when various flash modes are set;

FIG. 6B shows examples of display when various photographing modes are set;

FIG. 9 is a time chart illustrating the operation performed when the self-timer mode and the red-eye reducing mode are set.

DETAILED DESCRIPTION OF THE PREFERRED EMBODIMENT

An embodiment according to the present invention is explained in reference to FIGS. 1–9.

Figure 1:
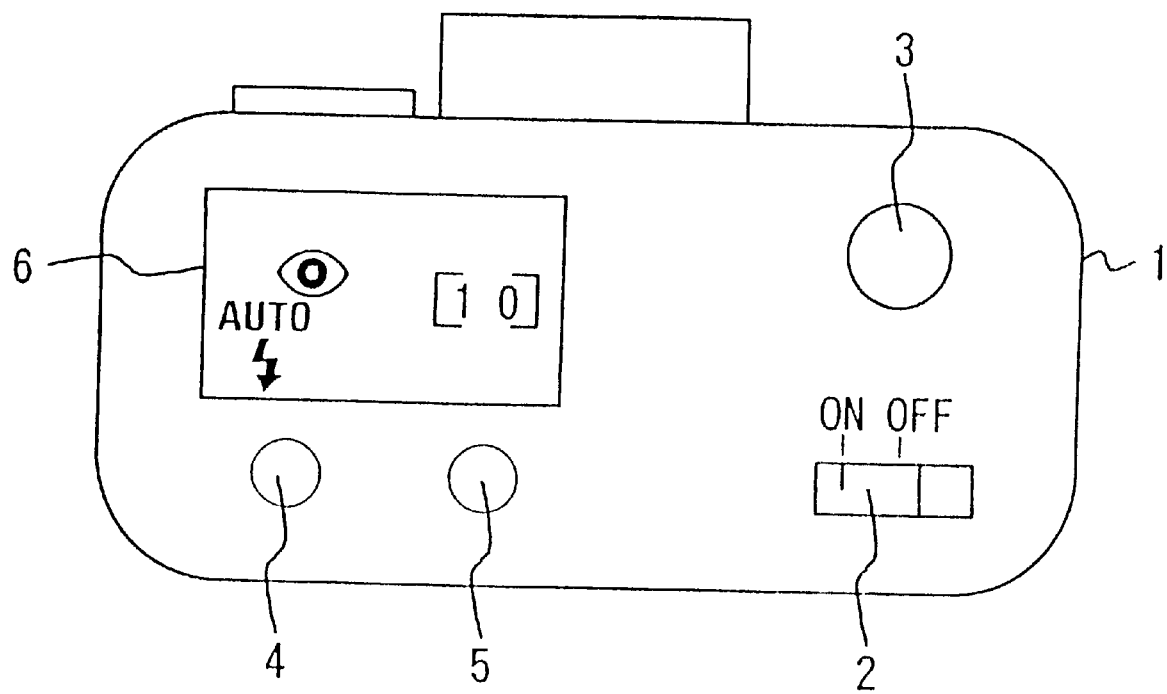
FIG. 1 is a view of the top surface of the camera in an embodiment according to the present invention.

FIG. 1 is a plan view of the camera according to the present invention. On the top surface of the camera main body 1, a power source switch 2, a release switch 3, a flash mode changeover switch 4 for switching among and setting four flash modes, which are to be explained later, a photographing mode changeover switch 5 for switching among and setting three photographing modes, and a liquid crystal display device 6, which indicates the flash mode and photographic mode that are set, are provided.

Figure 2:
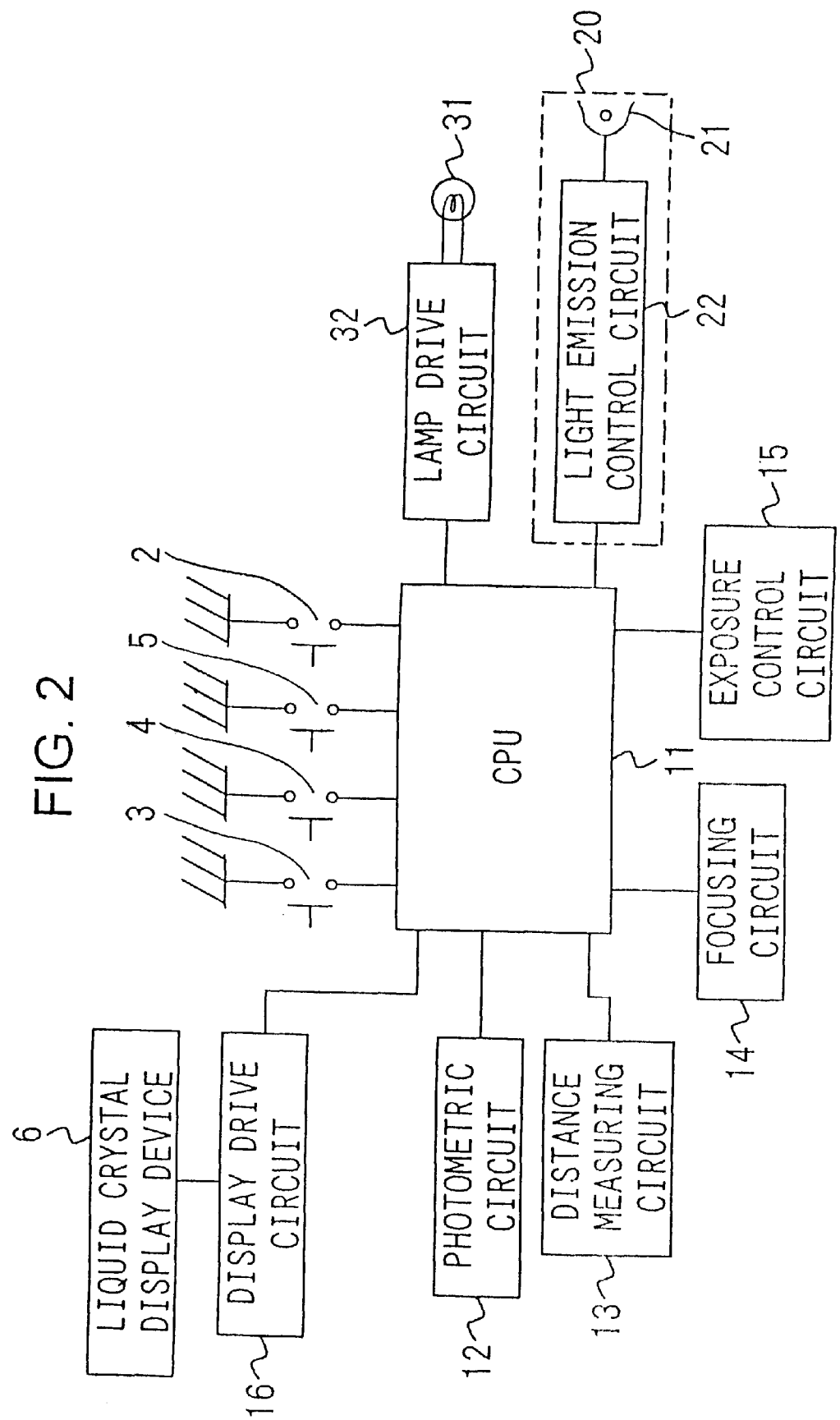
FIG. 2 is a block diagram showing the control system of the camera shown in FIG. 1.

FIG. 2 shows the control system of this camera. The various switches 2–5 described above, are connected to a control circuit (hereafter referred to as CPU) 11 having a CPU, ROM, RAM and the like. Also connected to the CPU 11 are a photometric circuit 12 for detecting the brightness of the photographic subject, a distance measuring circuit 13 for detecting the distance to the photographic subject, a focusing circuit 14, which drives the photographic lens to be focussed on the photographic subject, an exposure control circuit 15, which performs photographing by driving the aperture and the shutter, a display drive circuit 16 for the liquid crystal display device 6, an electronic flash device 20 and a lamp drive circuit 32 for the self-timer indicator lamp 31.

The electronic flash device 20 has a light emitting unit 21 and a light emission control circuit 22, which controls the light emission by the light emitting unit 21. The lamp 31 is provided on the front surface of the camera main body 1 and its light is radiated outward from the front of the camera. The light from the lamp 31 is of sufficient intensity to cause the pupils of a person to contract to the extent that the red-eye will not be noticeable. Because of this, the lamp 31 is also used as the light source for pre-light emission for red-eye reduction in this embodiment.

Figure 3:
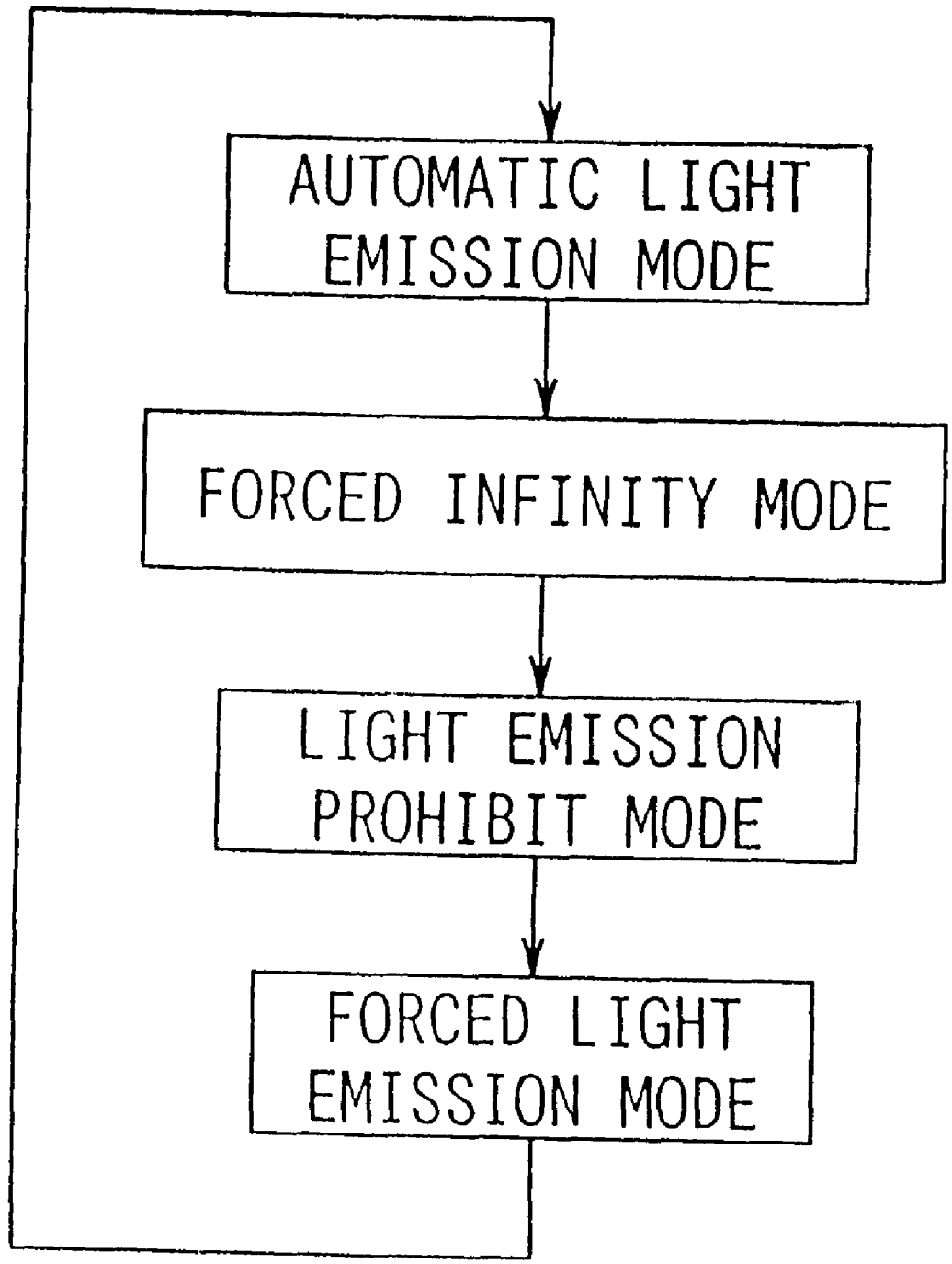
FIG. 3 shows switching of the flash modes.

The flash mode described above includes the following four modes: an automatic light emission mode, wherein the light emitting unit 21 automatically emits light when the brightness of the photographic subject is low, a forced infinity mode, wherein the photographing lens is forcibly driven to the point of infinity and, at the same time, light emission is prohibited, a light emission prohibit mode, wherein light emission is prohibited regardless of the brightness of the photographic subject or the photographing distance and a forced light emission mode, wherein light emission is performed without fail, regardless of the brightness of the photographic subject. The CPU 11 switches cyclically among the four flash modes, as shown in FIG. 3, every time the flash mode changeover switch 4 is turned ON.

Figure 4:
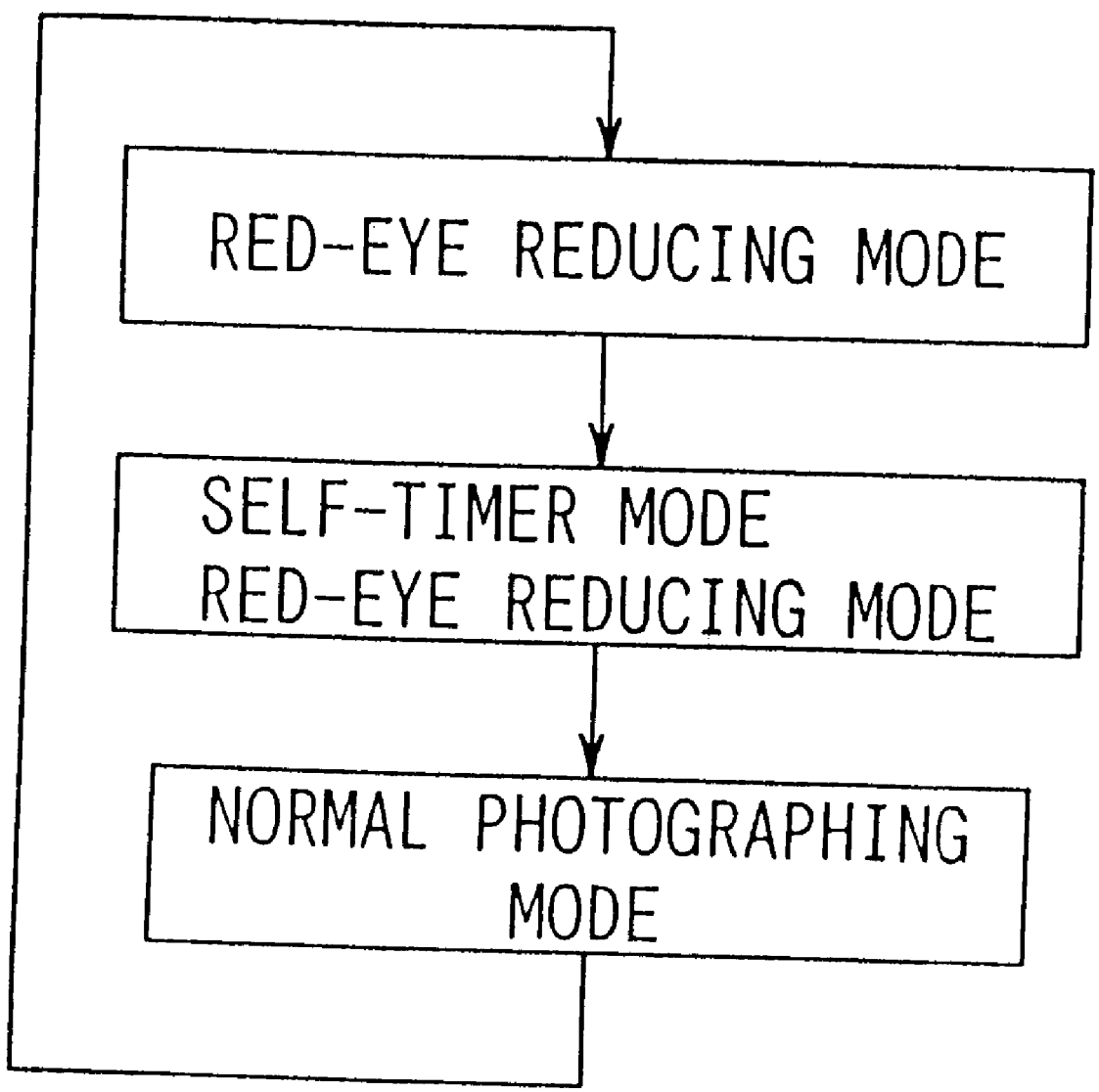
FIG. 4 shows switching of the photographing modes.

The photographing mode described above includes the following three modes: a normal photographing mode, a red-eye reducing mode, wherein pre-light emission for red-eye reduction is performed, and a self-timer mode, wherein self-timer photographing is performed. The CPU 11 switches cyclically among the three photographing modes, as shown in FIG. 4, every time the photographing mode changeover switch 5 is turned ON. In particular, in this embodiment, when the self-timer mode is set, the red-eye reducing mode is also automatically set.

Figure 5:
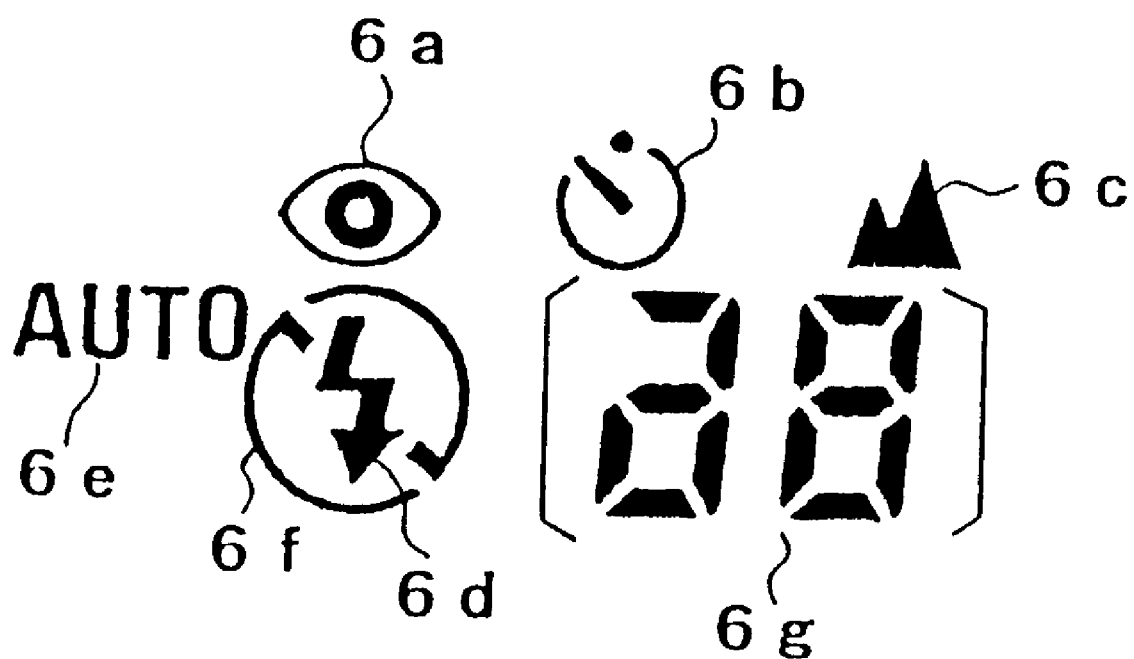
FIG. 5 shows the various indicator units in the liquid crystal display device.

FIG. 5 shows various indicator units of the liquid crystal display device 6. Reference number 6a indicates a red-eye indicator unit that indicates whether or not the red-eye reducing mode is set. Reference number 6b indicates a self-timer indicator unit that indicates whether or not the self-timer mode is set. Reference number 6c indicates the forced infinity indicator unit that indicates whether or not the forced infinity mode is set. Reference numbers 6d–6f indicate indicator units related to the flash modes. When only the indicator unit 6d is lit, it means that the forced light emission mode is set. When both the indicator units 6d and 6e are lit, it means that the automatic light emission mode is set. When both the indicator units 6d and 6f are lit, it means that the light emission prohibit mode is set. Reference number 6g indicates a count indicator unit for indicating the film count value.

When a mode is set in response to the operation of the switches 4, 5, the CPU 11 outputs a display signal which corresponds to the mode that has been set, to the display drive circuit 16 to display a specific indication on the liquid crystal display device 6. FIGS. 6A and 6B show the indication states when various modes are set.

Figure 7:
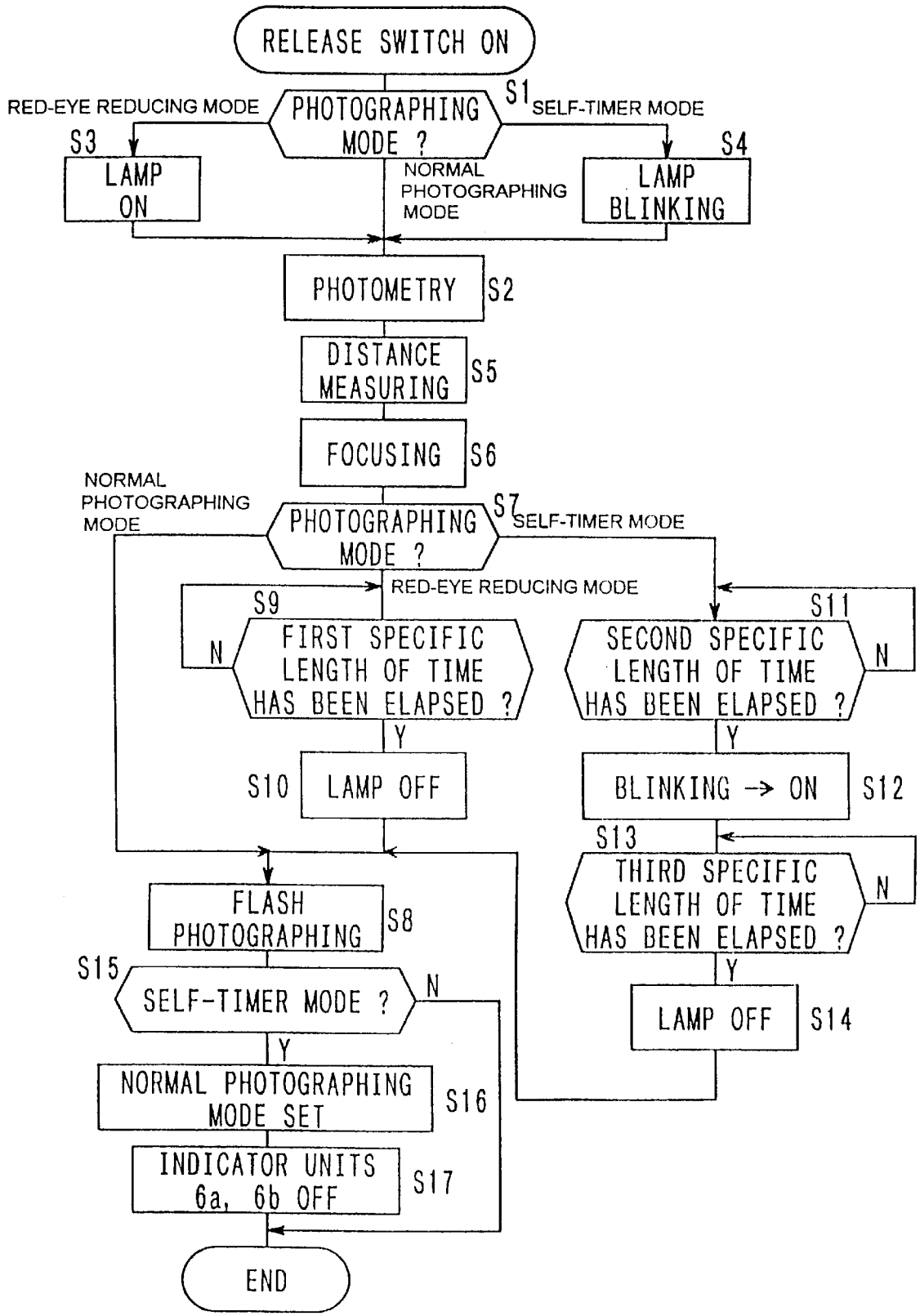
FIG. 7 is a flow chart illustrating the operation performed in the embodiment.

Next, the procedure of flash photographing control performed by the CPU 11 is explained in reference to the flow chart in FIG. 7. Note that the following explanation is made on the assumption that the flash mode is set for forced light emission mode.

This program is started up when the release switch 3 is turned ON and, in step S1, it determines the photographing mode which is currently set. If the normal photographing mode is set, the operation proceeds to step S2. If only the red-eye reducing mode is set, lighting of the lamp 31 is started via the lamp drive circuit 32 in step S3 before the operation proceeds to step S2. If both the self-timer mode and the red-eye reducing modes are set, blinking of the lamp 31 is started and also the counting of the self-timer time is started in step S4 before the operation proceeds to step S2. This time counting is performed by a timer (not shown) which is internally provided in the CPU 11.

In step S2, the photometric circuit 12 is operated and its output, i. e. , the brightness of the photographic subject, is input to the CPU 11. In step S5, the distance measuring circuit 13 is operated and its output, i. e., the photographic subject distance, is input to the CPU 11. In step S6, the photographing lens is driven for focus by the focussing circuit 14 based upon the photographic subject distance that has been input and the operation then proceeds to step S7.

In step S7, the current photographing mode is determined again and if the normal photographing mode is set, flash photographing is performed in step S8. To give a more detailed explanation, the exposure control circuit 15 is driven based upon the aperture value and shutter speed that have been calculated in accordance with the brightness of the photographic subject in order to perform a shutter release. And synchronized with the shutter release, light emission of the light emitting unit 21 is performed via the light emission control circuit 22.

On the other hand, if it is decided in step S7 that the red-eye reducing mode is set, the operation waits for a first specific length of time (for example, 1 second) to elapse from the time point at which the lighting of the lamp 31 was started, in step S9. After that, the lamp 31 is turned OFF in step S10 and flash photographing is performed in step S8. If it is decided in step S7 that both the self-timer mode and the red-eye reducing modes are set, the operation waits for a second specific length of time (for example, 9 seconds) to elapse from the time point at which the blinking of the lamp 31 is started, in step S11. Then, in step S12, the lamp 31 is switched from blinking to steady ON. In step S13, the operation waits for a third specific length of time (for example, 1 second) to elapse. When it has elapsed, the lamp 31 is turned OFF in step S14, and flash photographing is performed in step S8. The self-timer time is the sum total of the second specific length of time and the third specific length of time.

After step S8, a decision is made in step S15 as to whether or not the self-timer mode is set. If the self timer mode is not set, the processing ends there. If the self-timer mode is set, the normal mode is set in step S16 and also, the indicator units 6a and 6b shown in FIG. 6 are turned OFF in step S17 to end the processing.

The operation of the camera during the procedure described above is explained in reference to FIGS. 8 and 9.

Figure 8:
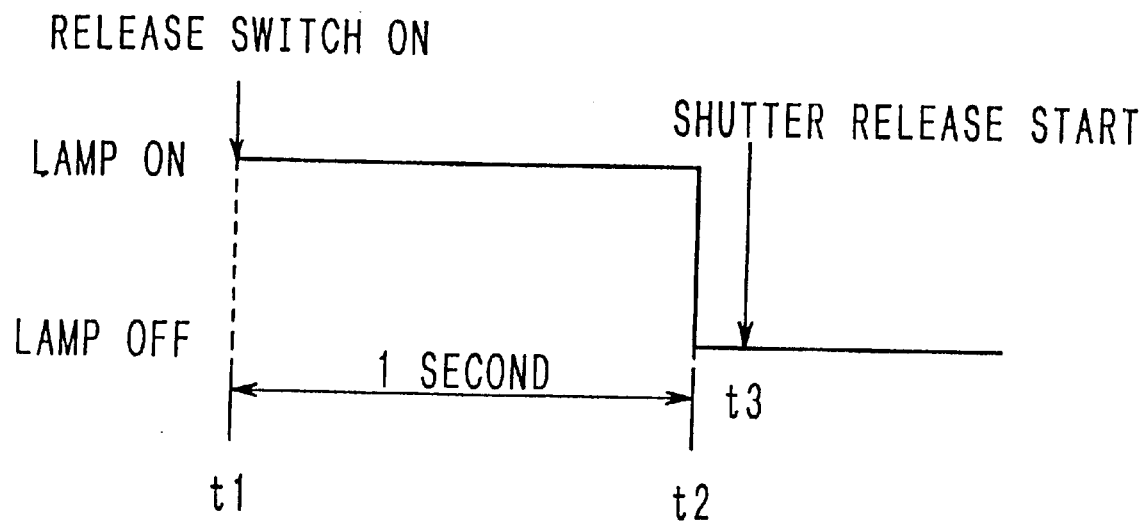
FIG. 8 is a time chart illustrating the operation performed when only the red-eye reducing mode is set.

During the red-eye reducing mode is set, the lamp 31 is turned ON when the release switch 3 is turned ON, at the time point ti in FIG. 8 (pre-light emission is performed). The light from the lamp 31 radiates outward from the front of the camera causing the pupils of the photographic subject (person) looking into the radiating light to contract. The lamp 31 is turned OFF at the time point t2, at which the first specific length of time (1 second) has elapsed from the time point at which the lighting of the lamp 31 is started. Flash photographing starts at the time point t3 before the contracted pupils of the photographic subject return to normal. As a result, in the finished photograph, the red-eye phenomenon is not conspicuous.

If, on the other hand, both the self-timer mode and the red-eye reducing mode are set, blinking of the lamp 31 starts when the release switch 3 is turned ON, at time point t11 in FIG. 9. The blinking of the lamp 31 indicates that the self-timer time is being counted. After that, at the time point t12, at which the second specific length of time has elapsed, the lamp 31 is switched from blinking to steady ON. The lamp 31 being ON steady indicates that photographing will be performed immediately and, at the same time, the lighting of the lamp 31 causes the pupils of the photographic subject to contract. The lamp 31 is turned OFF at the time point 13, at which the third specific length of time has elapsed from the time point t12. Following that, flash photographing starts at the time point t14. The length of time elapsing between the start of blinking of the lamp 31 and the start of the shutter release should be approximately 10 seconds, as shown in the figure, and the length of time of the lamp being ON should be approximately 1 second.

As has been explained so far, in this embodiment, when the self-timer mode is set, the red-eye reducing mode is also automatically set. As a result, when the self-timer mode is set, pre-light emission for red-eye reduction is performed without fail prior to flash photographing. This precludes the necessity for performing separate operations for setting the self-timer mode and setting the red-eye reducing mode, achieving an improvement in operability. It also ensures that occurrence of the red-eye phenomenon due to the photographer forgetting to set the red-eye reducing mode in the self-timer mode is prevented. Furthermore, since one operating member (the mode changeover switch 5) functions as an operating member for setting the self-timer mode and also as a operating member for setting the red-eye reducing mode, a reduction in the number of components and in production costs can be achieved.

Moreover, in this embodiment, when the self-timer mode is set, the blinking of the lamp 31 indicates that the time count by the self-timer is in progress, as in the prior art, and when the lamp 31 comes ON steady following that, it indicates that photographing will be performed immediately. It goes without saying that the lamp 31 coming ON steady also has the function of pre-light emission for red-eye reduction. This means that it is not necessary to provide a light emitting element specially for self-timer indication, achieving further reduction in the number of components and production costs. At the same time, battery power is saved in comparison with a camera with which the self-timer indication and pre-light emission for red-eye reduction are separately performed during self-timer photographing. Also, when the red-eye reducing mode is set, along with the self-timer mode, the self-timer mode and the red-eye reducing mode are cleared at the same time after self-timer photographing. This prevents self-timer photographing and pre-light emission being performed inadvertently in the next photographing session.

Note that, the explanation has been made for a case in which the forced light emission mode is set but that identical control is performed when the photographic subject is dark and the automatic light emission mode is set.

The sequence in which the photographing modes are set is not restricted to that in the embodiment. Moreover, the present invention can be applied to a camera with other photographing modes in addition to the three photographing modes described earlier. Also, while the example given has the lamp 31 performing pre-light emission, the pre-light emission may be performed by, for instance, an LED, which has sufficient light intensity to reduce the red-eye phenomenon, or, pre-light emission may be performed by using the electronic flash device 20. In addition, when the self-timer mode is set, the camera may perform self-timer photographing two or more times in succession in response to one release operation. Furthermore, an independent member for indicating that the self-timer time is being counted may be provided separately from the lamp 31.

We claim:

1. A self-timer camera with a red-eye reducing function comprising:

a photographing device that performs exposure and performs flash light emission when a condition for flash photographing is present;

a mode setting device that sets a red-eye reducing mode with a first operation and sets a self-timer mode with a second operation, wherein when said self-timer mode is set, said red-eye reducing mode is automatically set;

a light emitting device that performs pre-light emission for red-eye reduction prior to said flash light emission if a red-eye reducing mode is set when said condition for flash photographing is present;

a photographing control device that actuates said photographing device after a specific length of self-timer time has elapsed from a time point at which a photographing start instruction was output when said self-timer mode is set;

a light emission control device that, when said condition for flash photographing is present and also said self-timer mode is set, actuates said light emitting device to emit light in a first manner for a specific length of time early in said self-timer time to indicate that said self-timer is elapsing, and actuates said light emitting device to emit light in a second manner for a specific length of time later in said self-timer time to perform said pre-light emission;

a mode cancel device that, when said red-eye reducing mode is set and said self-timer mode is not set, maintains said red-eye reducing mode even after said photographing device performs exposure and performs flash light emission, and when both said red-eye reducing mode and said self-timer mode are set, cancels both said self-timer mode and said red-eye reducing mode after said photographing device performs exposure and performs flash light emission; and a display device that indicates a display for said red-eye reducing mode when said red-eye reducing mode is set, and cancels said display for said red-eye reducing mode when said red-eye reducing mode is canceled, and indicates a display for said self-timer mode when said self-timer mode is set and cancels said display for said self-timer mode when said self-timer mode is canceled.

2. A self-timer camera according to claim 1 further comprising;

a mode setting switch that is operated for selecting and setting said self-timer mode, said red-eye reducing mode and a normal photographing mode.

3. A self-timer camera according to claim 2 wherein:

said mode setting switch is turned ON by an operation and turned OFF by cancelling said operation, and said mode setting device cyclically switches among and sets said self-timer mode, said red-eye reducing mode and said normal photographing mode each time said mode setting switch is turned ON.

4. A self-timer camera according to claim 1 wherein;

said first manner is blinking and said second manner is steady on.

* * * * *